United States Patent Office 3,505,905
Patented Apr. 14, 1970

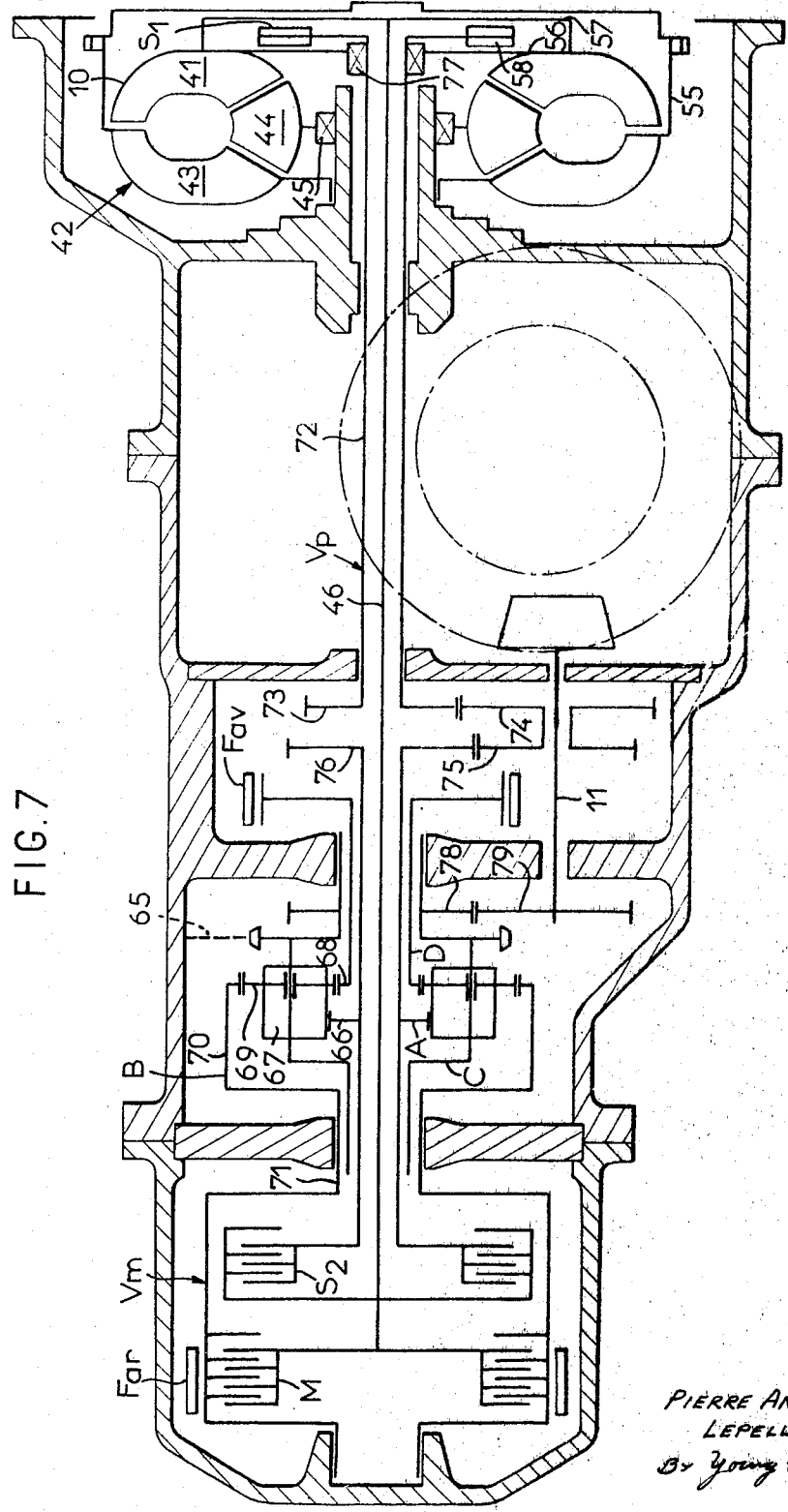

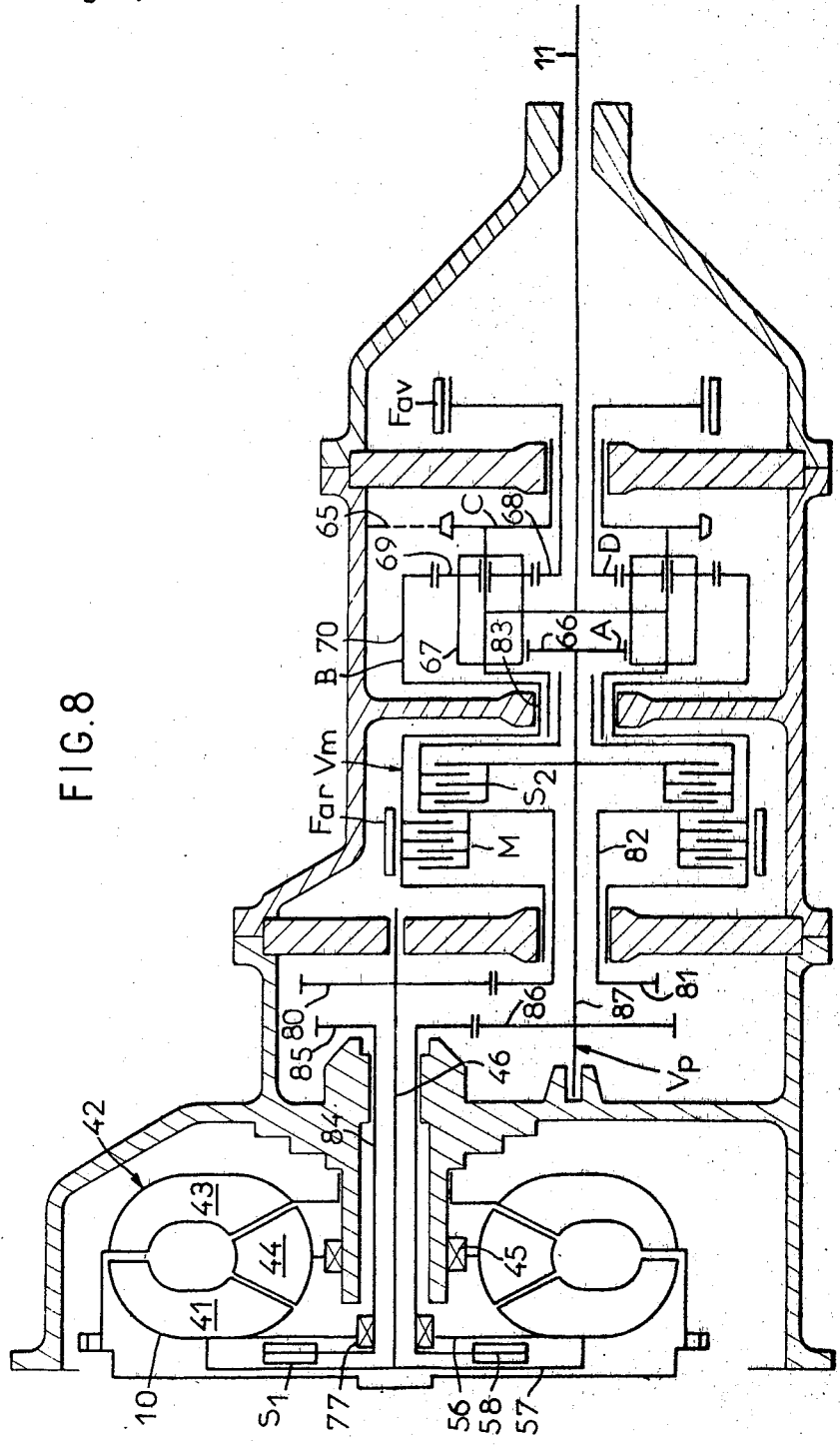

3,505,905
TRANSMISSION ESPECIALLY FOR
AUTOMOBILE VEHICLE
Pierre André Georges Lepelletier, Chatou, France, assignor to Societe Anonyme Francaise du Ferodo, Paris, France, a corporation of France
Filed Aug. 3, 1967, Ser. No. 658,230
Claims priority, application France, Aug. 16, 1966, 73,509; July 26, 1967, 115,688
Int. Cl. F16h 47/08
U.S. Cl. 74—688                    5 Claims

ABSTRACT OF THE DISCLOSURE

A known planetary gear train has four elements, the first of which may be free or coupled to the input, the second of which may be free or coupled or immobilized, the third of which is permanently connected to the output, and the fourth of which may be free or immobilized. This known gear train is improved by inserting, between the input and the first element, a ratio-varying means in the form of at least two selectively engageable clutches of different driving ratios. This does not modify the middle forward drive, but modifies in the same direction the reverse and low forward drives, and modifies in the opposite direction the high forward drive.

---

The present invention relates to a transmission system, especially for automobile vehicles, of the general type comprising a fixed gear-box casing or frame, movement input, a movement output, and a planetary gear-train having four elements of the type including a first element adapted either to be coupled to the movement input or to be free; a second element, adapted either to be coupled to the movement input or immobilized on the frame, or free; a third element, permanently coupled to the movement output; and a fourth element adapted either to be immobilized on the frame, or to be free; whereby: for a reversing condition, the first element is coupled to the movement input, the second element is immobilized and the fourth element is free; for a low forward running condition, the first element is coupled to the movement input, the second element is free and the fourth element is immobilized; for a middle condition of forward running, the first element is free, the second element is coupled to the movement input, and the fourth element is immobilized; and for a high condition of forward running, the first and second elements are coupled to the movement input and the fourth element is free.

It will be noted that the conditions of the gear train, both on reverse running and on forward running, are intrinsic conditions, that is to say they are inherent and proper to the train. The three conditions of forward running are termed "low," "middle" and "high" so as to correspond to the gear ratios, the term "middle" being adopted so as to indicate that the corresponding condition is comprised between the low and the high conditions.

The invention has for its object a transmission system of the type indicated above, which makes is possible to obtain a greater choice of gear ratios, both on reverse running and on forward running.

The invention is especially characterized in that the coupling means of the second element with the movement input has a ratio which is fixed and pre-determined and makes it possible to obtain a forward ratio, known as the middle ratio, while the coupling means of the first element with the movement input comprises ratio-varying means, which has the effect of varying, on the one hand in the same direction, the ratio on reverse running and the ratio of low forward speed and on the other hand, in the reverse direction, the forward high-gear ratio.

In one form of embodiment of the invention, the coupling for the first element has a plurality of alternative power paths, for example two, three, four, or more generally N paths, having different ratios, while the varying means comprise means for selecting one of the N paths, which gives N reverse ratios and 2N+1 forward ratios.

When required, the first element may in addition be made immobilizable on the frame in order to obtain a supplementary or overdrive forward ratio forming the 2N+2 forward ratio, for which the first element is immobilized, the second element is coupled to the movement take-off, and the fourth element is free.

The transmission according to the invention has considerable advantages, especially in automobile applications.

The necessary number of releasable coupling and immobilization means is very small and is equal to N+3 without overdrive and N+4 with overdrive, namely N releasable coupling means corresponding to the N power paths of the first element coupling, a releasable coupling means allotted to the middle path, two releasable immobilizing means allotted respectively to the second element for reverse gears and to the fourth element for the low and middle forward gears, and if there is an overdrive, a releasable immobilization means allotted to the first element.

In addition, the changing-up and changing-down of the N ratios on reverse running and of the 2N+1 (or 2N+2 in case of overdrive) forward ratios is effected merely by operating, for each change, two simultaneously releasable means, thus providing an easy control which is free from any discontinuity.

It will also be observed that the kinetic energy stored in the rotating members of the transmission is small on each of the forward or reversing ratios, which permits of convenient construction and gives an excellent efficiency.

In addition, the spacing of the ratios may be arranged in such manner as to be appropriate to various fields of application, and in particular to automobile applications. By way of example and without any implied limitation, it is possible to obtain forward ratios such as: first, 0.372; second, 0.556; third, 0.792; fourth, 1.074; and fifth, 1.295, which constitutes a well-spaced range giving remarkable performances from automobile vehicles, together with reverse-running ratios such as: first, 0.444; second, 0.665; which are also perfectly adapted.

Forms of embodiment of the invention are described below by way of example, reference being made to the accompanying drawings, in which:

FIG. 1 is a diagrammatic view of a transmission according to the invention, permitting the provision of five forward ratios and two reversing ratios;

FIG. 2 relates to an alternative form, in which the movement input has its axis parallel to and not coincident with the axis of the planetary gear train;

FIGS. 7 and 8 are similar to FIG. 6, but are respectively concerned with two further alternative forms.

Figure 1:
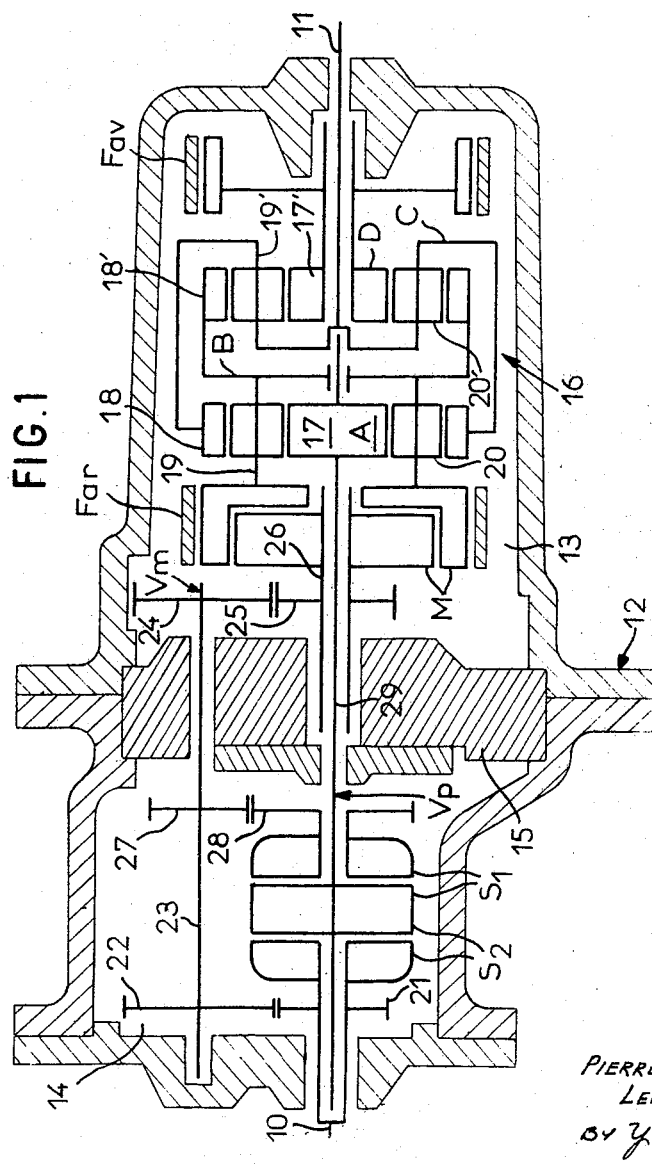

Reference will first be made to FIG. 1, in which a transmission, especially for an automobile vehicle, comprises a movement input shaft 10 and an output shaft 11, which in this case are coaxial. The fixed gear-box or frame box 12 containing the transmission is divided into two adjacent compartments 13 and 14, separated by a partition 15.

A planetary gear train 16 is housed in the compartment 13, and is of the general type having four elements A, B, C and D, with complete couplings, in which the angular speeds of all the elements are defined when the speeds of any two of them are given.

In the non-limitative example given in FIG. 1, the planetary gear comprises two simple identical planetary portions, each having a sun gear, a ring gear and a planet carrier, coupled together in a symmetrical manner by the planet carrier of one being fixed to the ring gear of the other and vice-versa.

A first simple planetary portion comprises a sun gear 17, a ring gear 18, a planet carrier 19 and planet gears 20. The second simple planetary portion comprises a sun gear 17', a ring gear 18', a planet carrier 19' and planets 29'.

The ring gear 18 and the planet carrier 19' are rigidly fixed to each other, while the ring gear 18' and the planet carrier 19' are fixed together.

The four elements A, B, C, D of the planetary gear train 16 thus arranged are in this case made-up in the following manner:

The first element A is constituted by 17. The second element B is formed by 18', 19. The third element C is constituted by 18, 19', and the fourth element B is formed by 17'.

The first element A is adapted either to be coupled to the movement input 10 or free.

The second element B is adapted either to be coupled to the movement input 10, or immobilized on the frame 12, or free.

The third element C is permanently coupled to the output shaft 11.

The fourth element D is adapted either to be immobilized on the gear-box 12, or free.

Consideration will first be given to the coupling means of the elements A and B with the movement input 10.

Beginning with the element B, it can be seen from FIG. 1 that the coupling means of the element B with the movement input 10 comprise a middle power path $V_m$, having a unitary nature with a fixed and pre-determined ratio.

Going from the input 10 to the element B, the middle path $V_m$ comprises:

A pinion 21 fixed on the shaft 10 and engaging with a pinion 22 fixed on a countershaft 23 parallel to the shaft 10;

A pinion 24, rigidly fixed to the shaft 23 and engaging with a pinion 25 fixed on a sleeve 26 which is free for rotation;

A clutch M, the middle gear clutch, interposed between the sleeve 26 and the element B and permitting, when engaged, the path $V_m$ to be put in use, and, when disengaged, the path $V_m$ is put out of use.

The coupling means of the element A with the movement input 10 comprise a first element coupling $V_p$ having a variable nature and comprising ratio-varying means.

The reproductive channel $V_p$ is a multiple channel comprising a plurality of branches, in this case two. One of the paths comprises the pinions 21 and 22, a pinion 27 fixed to the shaft 23, a pinion 28 engaging with the pinion 27, and a clutch $S_1$ interposed between the pinion 28 and a shaft 29 rigidly fixed to the element A.

The other path comprises a further clutch $S_2$, directly interposed between the shaft 10 and the shaft 29.

The clutches $S_1$ and $S_2$ form ratio-varying means of the coupling $V_p$ and when either the one or the other is engaged, permit this coupling to have either a ratio other than unity, determined by the pinions 21, 22, 27 and 28, or the ratio unity. The clutches $S_1$ and $S_2$ enable the coupling $V_p$ to be put out of operation when they are both disengaged.

There will now be considered the immobilization means of the immobilizable elements, that is to say the elements B and D.

These means comprise a brake $F_{ar}$, co-operating with the elements B so as to immobilize it for the purpose of the reverse gears, and a brake $F_{av}$, co-operating with the element D so as to immobilize it for the purpose of the low and middle forward gears.

As can be seen from FIG. 1, the compartment 13 of the frame 12 receives the planetary gear train A, B, C, D, the brakes $F_{ar}$ and $F_{av}$, the middle gear clutch M and the pinions 24, 25, while the other compartment 14 of the frame 12 receives the clutches $S_1$ and $S_2$ and the gear wheel systems 21, 22 and 27, 28.

The transmission thus constituted has one reversing condition and three forward conditions known respectively as the low, middle and high conditions.

In addition, the transmission has a neutral point, for which the elements A, B and D, or at least two of these, are released at the same time.

The sub-division of the coupling $V_p$ into two paths has the effect of doubling the reverse condition, the low forward condition and the high forward condition, which gives in all two reversing ratios, two low forward ratios, one forward middle ratio and two high forward ratios, that is to say five forward gears, in accordance with the following table, in which the sign )( indicates that one clutch or brake is engaged, while the sign ) ( indicates that it is released.

TABLE (FIG. 1)

|   | Reverse running condition | Neutral | Low forward condition | | Middle forward condition | High forward condition |
|---|---|---|---|---|---|---|
| A | Coupled to 10 | Free | Coupled to 10 | Free | Free | Coupled to 10 |
| B | Immobilized | do | Free | | Coupled to 10 | Do. |
| D | Free | do | Immobilized | | Immobilized | Free. |

|   | 1st reverse | 2nd reverse | Neutral | 1st forward | 2nd forward | 3rd forward middle | 4th forward | 5th forward |
|---|---|---|---|---|---|---|---|---|
| M | ) ( | ) ( | ) ( | ) ( | ) ( | )( | )( | )( |
| $S_1$ | )( | ) ( | ) ( | )( | ) ( | )( | )( | )( |
| $S_2$ | ) ( | )( | ) ( | ) ( | )( | ) ( | ) ( | ) ( |
| $F_{ar}$ | )( | )( | ) ( | ) ( | ) ( | ) ( | ) ( | ) ( |
| $F_{av}$ | ) ( | ) ( | ) ( | )( | )( | )( | ) ( | ) ( |

It will be noted that $F_{av}$ is engaged for all the low and middle forward speeds, but is released for the high forward speeds.

It should be observed that the change of ratio of the coupling $V_p$ obtained by releasing $S_1$, assumed to be first engaged, and by engaging $S_2$, assumed to be first released, results in a change-up from 1st to 2nd in reverse, a change-up from 1st to 2nd in low forward gear, and a change-down from 5th to 4th in top forward gear.

Good results have been obtained with the following numbers of teeth on the various pinions and toothed wheels.

|  | Teeth |
|---|---|
| Sun gear 17 | 26 |
| Ring gear 18 | 54 |
| Planet carrier 19 | 14 |
| Sun gear 17' | 26 |
| Ring gear 18' | 54 |
| Planet carrier 19' | 14 |
| Pinions: | |
| 21 | 31 |
| 22 | 40 |
| 24 | 38 |
| 25 | 33 |
| 27 | 28 |
| 28 | 43 |

The gear ratios are then as follows:

|  | Reverse | Forward |
|---|---|---|
| First | 0.243 | 0.204 |
| Second | 0.482 | 0.403 |
| Third |  | 0.602 |
| Fourth |  | 0.839 |
| Fifth |  | 1.078 |

Figures 2, 3:
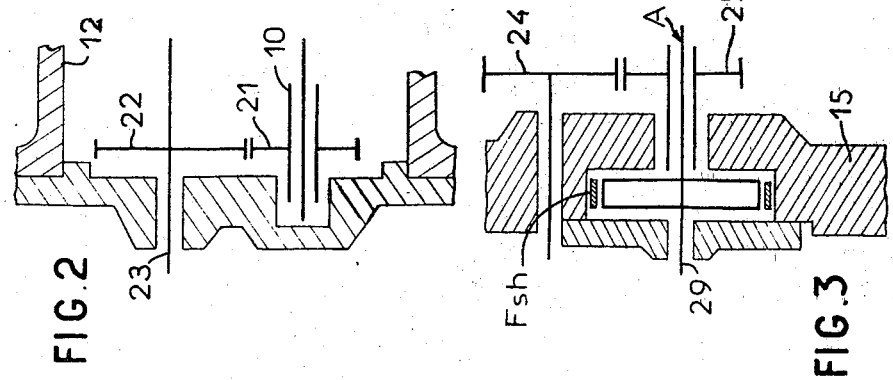
FIG. 3 shows another alternative form permitting an additional ratio or over-drive ratio to be obtained on forward running.

Reference will now be made to FIG 2, in which the arrangement is similar to that which has been described with reference to FIG. 1, but in which the movement input shaft is constituted by the shaft 23, while the shaft 10 serves as a countershaft. The various preceding ratios are all staggered, taking account of the multiplication due to the pinions 22 and 21, that is to say in the proportion of 40 to 31.

The following gear ratios are then obtained:

|  | Reverse | Forward |
|---|---|---|
| First | 0.314 | 0.263 |
| Second | 0.622 | 0.521 |
| Third |  | 0.776 |
| Fourth |  | 1.081 |
| Fifth |  | 1.390 |

It should be observed that the alternative case of FIG. 2 can be applied not only to the case of FIG. 1, but also to all those of the other figures.

Reference will now be made to FIG. 3, in which, in addition to the possibility of its drive by either of the clutches $S_1$ and $S_2$ and its possibility of release by disengagement of the two clutches $S_1$ and $S_2$, the first element A has been provided so as to be immobilized on the frame 12 in order to obtain an additional ratio, known as the forward overdrive ratio, for which the element A is immobilized, the element B is coupled to the movement input and the element D is free.

To this end, a brake $F_{sh}$ is associated with the shaft 29 rigidly fixed to the element A, and is housed in the partition 15 which separates the compartments 13 and 14 of the gear-box 12.

The overdrive which, in the case of the application to FIG. 1 forms a sixth forward gear, is obtained with the following conditions of engagement and release of the various brakes and clutches:

| M | )( |
|---|---|
| $S_1$ | ) ( |
| $S_2$ | ) ( |
| $F_{ar}$ | ) ( |
| $F_{av}$ | ) ( |
| $F_{sh}$ | )( |

In the case of the application to FIG. 1, the overdrive ratio is 1.321 and in that of the application to FIG. 2, it is 1.705.

It should be noted that the overdrive ratio of FIG. 3 may be applied not only to the cases of FIG. 1 and FIG. 2, but also to all cases of the other figures.

Figure 4:
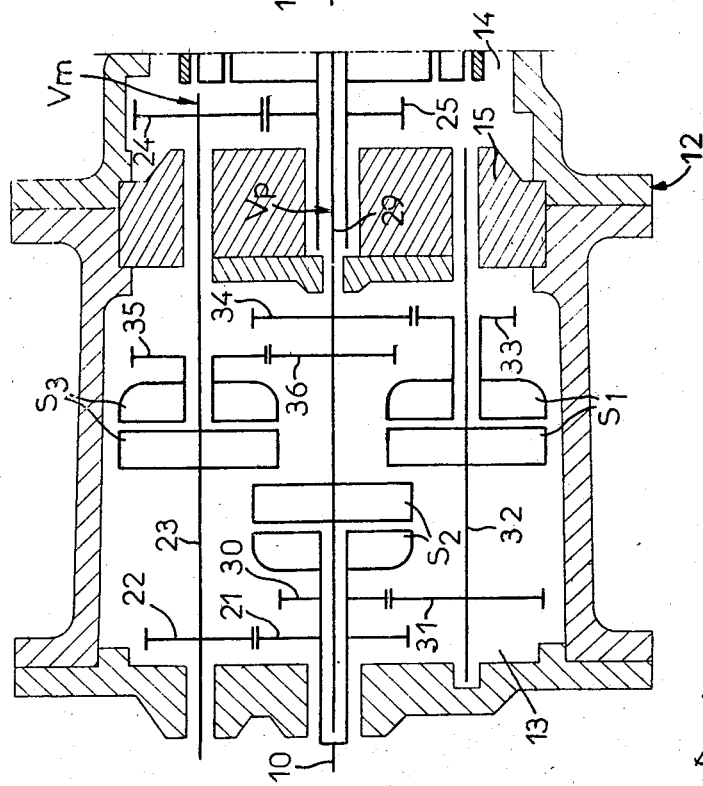
FIG. 4 is a partial view similar to that of FIG. 1, but relates to a transmission permitting the provision of seven forward-running ratios and three reverse ratios.

Reference will now be made to FIG. 4, in which the arrangement is similar to that which has been described with reference to FIG. 1, but in which the coupling $V_p$ has three paths comprising respectively three clutches $S_1$, $S_2$ and $S_3$, making it possible to triple the condition of reverse, the low forward condition and the high forward condition, which gives in all three reverse, three low forward, one middle forward and three high forward ratios, that is to say seven forward ratios, to which there may be added an overdrive if so required, forming the eighth forward gear by virtue of the addition of a supplementary brake such as the brake $F_{sh}$ of FIG. 3.

One of the three paths of the coupling $V_p$ comprises a pinion 30 fixed on the shaft 10 and engaging with a pinion 31 fixed to a countershaft 32 and couplable by the clutch $S_1$ with a pinion 33 which in turn engages with a pinion 34 rigidly fixed to the shaft 29.

A second path of the coupling $V_p$ comprises the clutch $S_2$ directly interposed between the shaft 10 and the shaft 29. The third path of the coupling $V_p$ comprises the pinions 21 and 22, the shaft 23 and the clutch $S_3$, interposed between the shaft 23 and a pinion 35 which engages with a pinion 36 fixed to the shaft 29.

The following table indicates the diagram of operation of the transmission of FIG. 4.

TABLE (FIG. 4)

|  | Reverse running condition | Neutral | Low forward condition | Middle forward condition | High forward condition |
|---|---|---|---|---|---|
| A | Coupled to 10 | Free | Coupled to 10 | Free | Coupled to 10. |
| B | Immobilized | do | Free | Coupled to 10 | Do. |
| D | Free | do | Immobilized | Immobilized | Free. |

|  | 1st rev. | 2nd rev. | 3rd rev. | Neutral | 1st for'd | 2nd for'd | 3rd for'd | 4th forward middle | 5th for'd | 6th for'd | 7th for'd |
|---|---|---|---|---|---|---|---|---|---|---|---|
| M | )( | )( | )( | )( | )( | )( | )( | )( | )( | )( | )( |
| $S^1$ | )( | )( | )( | )( | )( | )( | )( | )( | )( | )( | )( |
| $S^2$ | )( | )( | )( | )( | )( | )( | )( | )( | )( | )( | )( |
| $S^3$ | )( | )( | )( | )( | )( | )( | )( | )( | )( | )( | )( |
| $F=^/$ | )( | )( | )( | )( | )( | )( | )( | )( | )( | )( | )( |
| $F=^°$ | )( | )( | )( | )( | )( | )( | )( | )( | )( | )( | )( |

It will be noted that $F_{av}$ is engaged for all the low and middle forward speeds, but is released for the high forward speeds.

Good results have been obtained with the same planetary gear as that of FIG. 1, and with the following number of teeth of the pinions.

| Pinions: | Teeth |
|---|---|
| 21 | 40 |
| 22 | 21 |
| 24 | 34 |
| 25 | 37 |
| 30 | 31 |
| 31 | 40 |
| 33 | 28 |
| 34 | 43 |
| 35 | 38 |
| 36 | 33 |

The following gear ratios are then obtained:

|  | Reverse | Forward |
|---|---|---|
| First | 0.243 | 0.204 |
| Second | 0.482 | 0.403 |
| Third | 0.715 | 0.598 |
| Fourth |  | 0.800 |
| Fifth |  | 1.040 |
| Sixth |  | 1.273 |
| Seventh |  | 1.512 |

When an overdrive is provided, its ratio is 1.755.

When the movement input is formed by the shaft 23 instead of the shaft 10, the various ratios given above are all staggered, taking account of the step-down ratio due to the pinions 22 and 21, that is to say in the proportion of 31 to 40.

In the alternative form of FIG. 5, the arrangement is again similar to that which has been previously described, but the coupling $V_p$ now has four branches comprising respectively four clutches $S_1$, $S_2$, $S_3$ and $S_4$, making it possible to quadruple the condition of reverse, the low forward condition and the high-forward condition, which gives in all four reverse, four low forward, one middle forward, and four high forward gears, that is to say nine forward gears, to which there may if so desired, be added an overdrive forming a tenth forward gear, by virtue of the addition of a supplementary brake such as the brake $F_{sh}$ of FIG. 3.

One of the four arms of the coupling $V_p$ comprises the pinions 30, 31, the shaft 32, the clutch $S_1$ and the pinions 33, 34.

A second branch of the coupling $V_p$ comprises the pinions 30, 31, the shaft 32, the clutch $S_2$ and a pinion 37 engaging with a pinion 38 fixed on the shaft 29.

A third branch of the coupling $V_p$ comprises the pinions 21, 22, the shaft 23, the clutch $S_3$ and the pinions 35 and 36.

The fourth branch of the coupling $V_p$ comprises the pinions 21, 22, the shaft 23, the clutch $S_4$ and a pinion 39 engaging with a pinion 40 rigidly fixed to the shaft 29.

Figure 5:
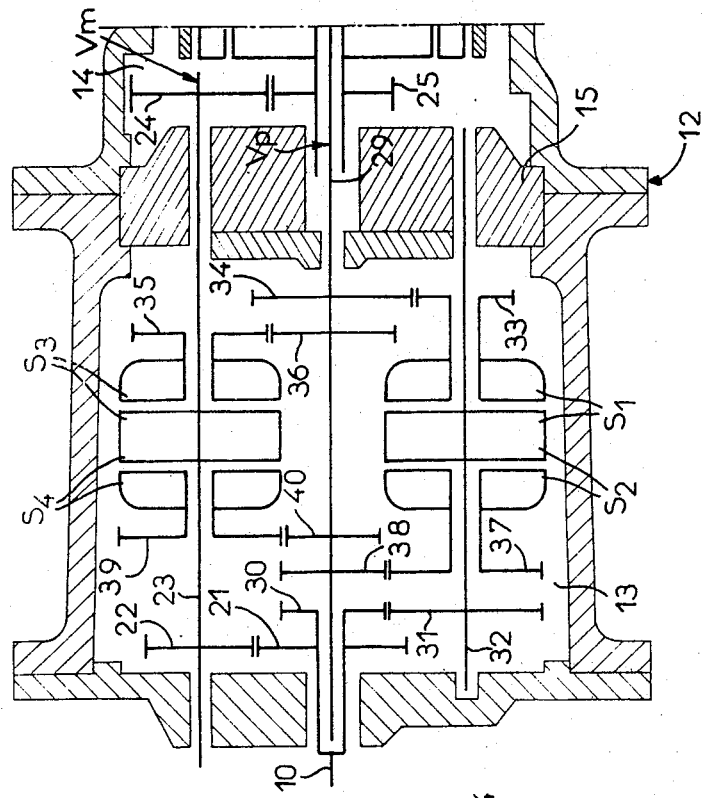
FIG. 5 is a partial view similar to that of FIG. 4, but relates to a transmission which can provide nine forward ratios and four reverse ratios.

The following table indicates the diagram of operation of the transmission shown in FIG. 5.

Pinions: Teeth
- 37 — 40
- 38 — 31
- 39 — 43
- 40 — 28

The following gear ratios are then obtained:

|  | Reverse | Forward |
|---|---|---|
| First | 0.243 | 0.204 |
| Second | 0.482 | 0.403 |
| Third | 0.715 | 0.598 |
| Fourth | 0.953 | 0.798 |
| Fifth |  | 1.002 |
| Sixth |  | 1.247 |
| Seventh |  | 1.485 |
| Eighth |  | 1.718 |
| Ninth |  | 1.957 |

When an overdrive is provided, its ratio is 2,200.

When the movement input is constituted by the shaft 23 instead of the shaft 10, the various ratios given above are all staggered, taking account of the step-down ratio due to the pinions 22 and 21, that is to say in the proportion of 31 to 40.

It will be understood that a drive of any appropriate type, associated with the transmission for actuating the various operating members, namely M, $S_1$, $S_2$, $S_3$, $S_4$, $F_{ar}$ and $F_{av}$ in the case of FIG. 5, and where applicable $F_{sh}$ in the case of FIG. 3, may be provided either so as to make it possible to obtain the whole of the possible ratios, in the present case four reverse and nine or ten forward ratios, or so as to obtain part only, considered sufficient for the application contemplated, of the possible ratios. This observation is applicable not only to FIG. 5, but also to all the other forms of embodiment described and/or contemplated.

Figure 6:
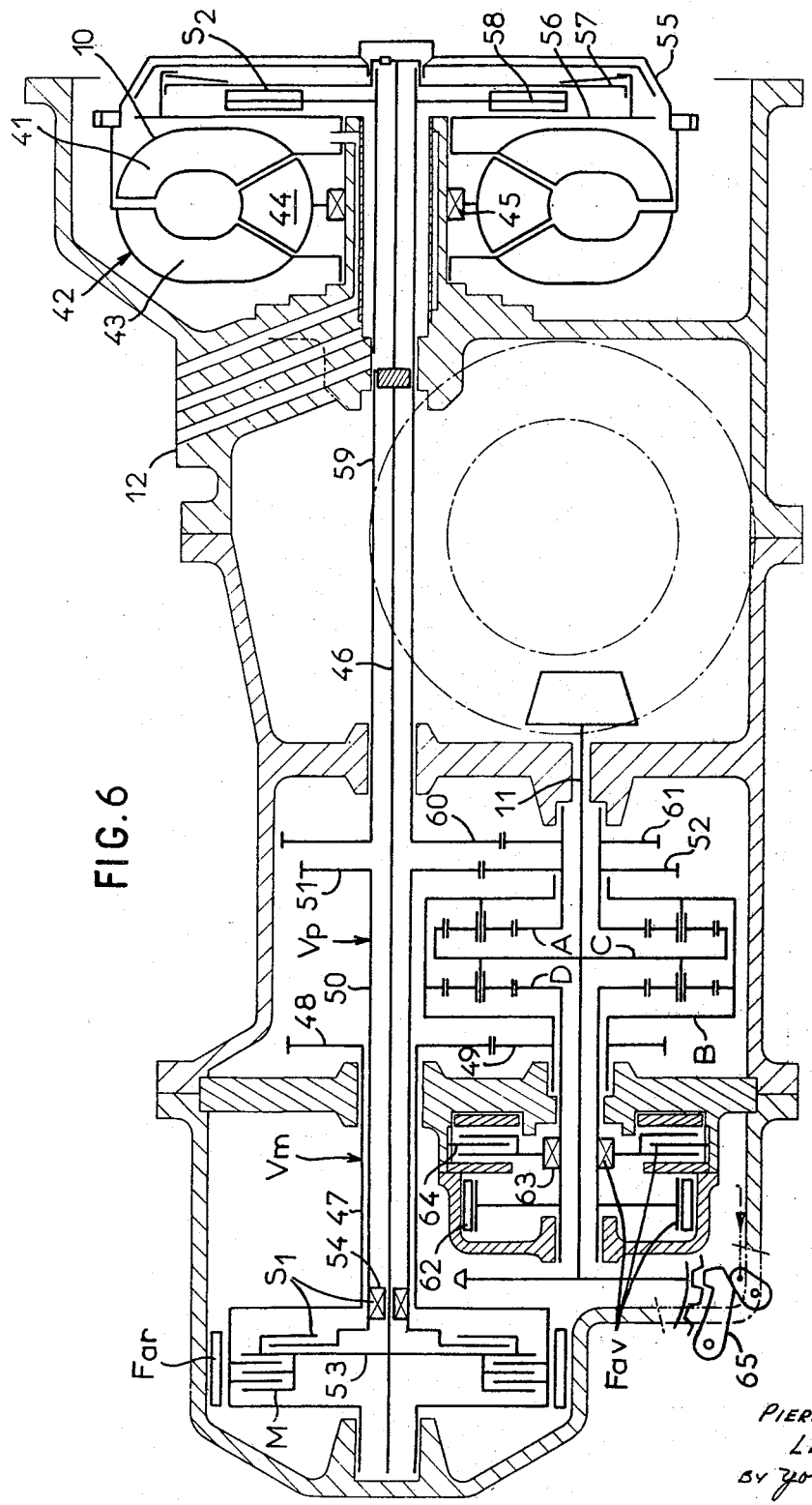
FIG. 6 is a view of a transmission according to the invention, in which the movement input is constituted by the turbine of a hydraulic torque converter.

Reference will now be made to FIG. 6 which concerns a transmission with two reverse gears and five forward gears as in FIG. 1, but in which the movement input 10 is constituted by the turbine 41 of a hydrokinetic coupling apparatus 42, such as a hydraulic torque converter or coupler, in this case a converter, of which the impeller is seen at 43 and at 44 the reactor coupled to the fixed frame 12 by a free-wheel 45. Hydraulic torque converters

TABLE (FIG. 5)

|  | Reverse running conditions | Neutral | Low forward condition | Middle for'd cond'n | High forward condition |
|---|---|---|---|---|---|
| A | Coupled to 10 | Free | Coupled to 10 | Free | Coupled to 10. |
| B | Immobilized | do | Free | Coupldd to 10 | Do. |
| D | Free | do | Immobilized | Immoblized | Free. |

|  | 1st rev. | 2nd rev. | 3rd rev. | 4th rev. | Neutral | 1st for'd | 2nd for'd | 3rd for'd | 4th for'd | 5th middle for'd | 6th for'd | 7th for'd | 8th for'd | 9th for'd |
|---|---|---|---|---|---|---|---|---|---|---|---|---|---|---|
| M | ){ | ){ | ){ | ){ | ){ | )( | )( | )( | )( | )( | )( | )( | )( | )( |
| $S_1$ | )( | )( | )( | )( | )( | )( | )( | )( | )( | )( | )( | )( | )( | )( |
| $S_2$ | )( | )( | )( | )( | )( | )( | )( | )( | )( | )( | )( | )( | )( | )( |
| $S_3$ | )( | )( | )( | )( | )( | )( | )( | )( | )( | )( | )( | )( | )( | )( |
| $S_4$ | )( | )( | )( | )( | )( | )( | )( | )( | )( | )( | )( | )( | )( | )( |
| $F_{ar}$ | )( | )( | )( | )( | )( | )( | )( | )( | )( | )( | )( | )( | )( | )( |
| $F_{av}$ | )( | )( | )( | )( | )( | )( | )( | )( | )( | )( | )( | )( | )( | )( |

It should be observed that $F_{av}$ is engaged for all the low and middle forward speeds, but is released for the high forward gears.

Good results have been obtained with the same planetary gearing as that of FIG. 1, and with the following numbers of teeth on the pinions.

Pinions: Teeth
- 21 — 40
- 22 — 31
- 24 — 38
- 25 — 33
- 30 — 31
- 31 — 40
- 33 — 28
- 34 — 43
- 35 — 38
- 36 — 33 or couplers of the type of FIGS. 6–8 are shown and described in greater detail in U.S. Patent No. 3,213,988, Oct. 26, 1965.

The middle power path $V_m$ comprises a central shaft 46 permanently fixed to the turbine 10, the clutch M, a shaft 47 surrounding the shaft 46 and a pinion 48 fixed to the shaft 47 and engaging with a pinion 49 rigidly fixed to the second element B.

The coupling $V_p$ has two paths. One of the paths comprises the shaft 46, the clutch $S_1$ a shaft 50, concentric with the shafts 46 and 47, and a pinion 51 fixed to the shaft 50 and engaging with a pinion 52 fixed on the first element A. It will be seen from FIG. 6 that the clutch $S_1$ is made-up of a clutch 53 of small capacity connected in parallel with a free-wheel 54. The other path $V_p$ comprises the clutch $S_2$ which is housed in the same bell 55 filled with oil as the converter 42, and is composed of a pair of plates 56 and 57 in cylinder-piston relation, fast for rotation with the turbine 41 and with a friction disc 58 fixed for rotation with a shaft 59. The latter surrounds the shaft 46 and carries a pinion 60 which engages with a pinion 61 fixed to the first element A.

There is provided at $F_{ar}$ the reversing brake which co-operates in the first and second reverse gears with the second element B, and which in this case is applied to the shaft 47 and there can be seen at $F_{av}$, the forward-running brake which co-operates in the first, second and third forward gears with the second element B, and which in this case consists of a small capacity brake 62 connected in parallel with a free-wheel 63 which is coupled to the frame 12 by a clutch 64.

In addition, there is seen at 65 a parking finger by means of which the output shaft 11 can be locked.

The planetary gear system A, B, C, and D has the same arrangement as that of FIG. 1, with wheels and pinions having the same number of teeth, the elements C and D being the corresponding third and fourth elements, respectively.

The other pinions have the following numbers of teeth.

| Pinions: | Teeth |
|---|---|
| 48 | 27 |
| 49 | 23 |
| 51 | 24 |
| 52 | 26 |
| 60 | 29 |
| 61 | 21 |

There are then obtained the following gear ratios:

| | Reverse | Forward |
|---|---|---|
| First | 0.444 | 0.372 |
| Second | 0.665 | 0.556 |
| Third | | 0.793 |
| Fourth | | 1.074 |
| Fifth | | 1.295 |

It will be noted that the special construction of $S_1$ by means of a clutch of small capacity and a free-wheel coupled in parallel, excludes in this case the introduction of a sixth gear by an overdrive brake, which necessitates the complete release of the channel $S_1$, not obtained by reason of the choice of the free-wheel.

Reference will now be made to FIG. 7, in which the arrangement is similar to that of FIG. 6 with a hydraulic torque converter 42, and also makes it possible to obtain two reversing gear ratios and five forward ratios.

The planetary gear train A, B, C, D is of the same general type as that of FIG. 1, but has a different arrangement and comprises two sets of planets engaging with each other. The element A is a sun gear 66 which engages with planet 67, while the element D is a further sun gear 68 which engages with another planet 69. The two planets 67 and 69 are carried by the element C acting as a planet carrier and engaging with each other. The element B is a ring-gear 70 which engages with the planet 69.

The middle path $V_m$ comprises the central shaft 46 which is permanently fixed to the turbine 41, the clutch M, and a shaft 71 fixed to the element B.

The coupling $V_p$ has two paths. One of the paths comprises the clutch $S_1$, a shaft 72 carrying a pinion 73 which engages with a pinion 74, the latter being rigidly fixed to another pinion 75. The set of pinions 74 and 75 is for example mounted freely around the shaft 11. The pinion 75 engages with a pinion 76 fixed to the element A. It will be noted from FIG. 7 that the clutch $S_1$ is housed in the bell 55 filled with oil, with a construction similar to that of the clutch 56, 57 and 58 of FIG. 6. In this case, the clutch $S_1$ is composed of the clutch 56, 57 and 58 which is provided in FIG. 7 with a small capacity and which is connected in parallel with a free-wheel 77.

The other path of the coupling $V_p$ comprises the clutch $S_2$ interposed directly between the shaft 46 and the element A. There is recognized at $F_{ar}$ the reverse running brake associated with the element B, at $F_{av}$, the forward brake associated with the element D, and at 65 the parking finger. It will be seen that the output shaft 11 is mounted parallel to the axis of the planetary gearing A, B, C, D and is coupled to the element C by a pair of pinions 78 and 79.

Good results have been obtained with the following numbers of teeth on the various pinions.

| | Teeth |
|---|---|
| Sun gear 66 | 28 |
| Planet carrier 68 | 23 |
| Ring gear 70 | 79 |
| Pinions: | |
| 73 | 22 |
| 74 | 28 |
| 75 | 23 |
| 76 | 27 |
| 78 | 27 |
| 79 | 23 |

The following gear ratios were then obtained:

| | Reverse | Forward |
|---|---|---|
| First | 0.366 | 0.366 |
| Second | 0.548 | 0.548 |
| Third | | 0.774 |
| Fourth | | 1.000 |
| Fifth | | 1.182 |

Reference will now be made to FIG. 8, in which the arrangement is similar to that of FIG. 6 or FIG. 7, with a hydraulic torque converted 42, and also enables two reverse ratios and five forward ratios to be obtained.

The planetary gear system A, B, C, D is of the same general type as that of FIG. 1, and has an arrangement similar to that of FIG. 7, with two sets of planets 67 and 69 in engagement with each other. The element A is the sun gear 66 which engages with the planet 67, while the element D is the sun gear 68 which engages with the planet 69. The two planets 67 and 69 are mounted on the element C acting as a planet carrier, and engage with each other. The element B is the ring gear 70 which engages with the planet 69.

The middle path $V_m$ comprises the central shaft 46 permanently fixed to the turbine 41, a pair of pinions 80 and 81, a shaft 82, the clutch M and a shaft 83 rigidly fixed to the element B.

The coupling $V_p$ has two paths. One of the paths comprises the clutch $S_1$, a shaft 84, a pair of pinions 85 and 86, and a shaft 87 fixed to the element A. It will be seen from FIG. 8 that, as in FIG. 7, the clutch $S_1$ is housed in the bell 55 and is composed of the clutch 56, 57, 58 of small capacity, mounted in parallel with the free wheel 77.

The other path $V_p$ comprises the clutch $S_2$ interposed between the shaft 82 and the shaft 87 fixed to the element A. There is again seen at $F_{ar}$ the reverse-running brake associated with the element B, at $F_{av}$ the forward-running brake associated with the element D, and at 65 the parking finger.

Good results have been obtained with the following numbers of teeth on the various pinions.

| | Teeth |
|---|---|
| Sun gear 66 | 28 |
| Planet carrier 68 | 23 |
| Ring gear 70 | 79 |
| Pinions: | |
| 80 | 27 |
| 81 | 23 |
| 85 | 22 |
| 86 | 28 |

The following various gear ratios were then obtained:

| | Reverse | Forward |
|---|---|---|
| First | 0.430 | 0.430 |
| Second | 0.644 | 0.644 |
| Third | | 0.908 |
| Fourth | | 1.174 |
| Fifth | | 1.390 |

What I claim is:

1. In a transmission, especially for automobile vehicles, comprising a fixed frame, a movement input shaft, a movement output shaft, and a planetary gear train connecting said input shaft to said output shaft, said train having four elements of the type including a first element, control means by which said first element can be coupled to said movement input shaft or free; a second element, control means by which said second element can be coupled to said movement input shaft, or braked, or free; a third element permanently coupled to the movement output shaft; a fourth element, and control means by which said fourth element can be braked or free; said elements of said train meshing with each other to provide one reverse running condition and three forward running conditions which are low, intermediate and high; the elements of said train being arranged relative to each other such that for the reverse condition, the first element is coupled to the movement input shaft, the second element is braked and the fourth element is free; for the low forward condition, the first element is coupled to the movement input shaft, the second element is free and the fourth element is braked; for the intermediate forward condition, the first element is free, the second element is coupled to the movement input shaft and the fourth element is braked; and for the high forward condition, the first and second elements are coupled to the movement input shaft and the fourth element is free; the improvement wherein said control means of said first element comprise at least two clutches one of which when engaged while the other is disengaged defines a first connection path between said input shaft and said first element, and the other of which when engaged while the said one is disengaged defines a second connection path between said input shaft and said first element, gear means in at least one of said paths for establishing different ratios in both paths, and means for selectively placing either of said at least two clutches in driving relation between the movement input shaft and the first element thereby to vary on the one hand in the same direction the reverse ratio and the low forward ratio, and on the other hand, in the opposite direction, the high forward ratio of the planetary gear train.

2. A transmission as claimed in claim 1, in which said control means for said first element includes means for braking said first element so as to obtain an overdrive ratio, for which the first element is braked, the second element is coupled to the movement input shaft, and the fourth element is free.

3. A transmission as claimed in claim 1, and a reversing brake cooperating with said second element to brake said second element in order to obtain reverse gear ratios, and a forward running brake cooperating with the fourth element to brake the fourth element for obtaining low and intermediate forward ratios.

4. A transmission as claimed in claim 3, and an overdrive brake cooperating with said first element to brake said first element in order to obtain an overdrive gear ratio.

5. A transmission as claimed in claim 1, and a hydrokinetic coupling apparatus having a turbine that rotates said movement input shaft.

References Cited

UNITED STATES PATENTS

| | | | |
|---|---|---|---|
| 3,152,491 | 10/1964 | Wiggermann | 74—740 |
| 3,285,100 | 11/1966 | Peltner et al. | 74—688 |
| 2,844,975 | 7/1958 | Kelbel et al. | 74—759 |
| 2,871,726 | 2/1959 | Kamlukin | 74—740 X |
| 2,886,984 | 5/1959 | Whelpley | 74—759 |
| 3,255,642 | 6/1966 | Christenson et al. | 74—759 X |

ARTHUR T. McKEON, Primary Examiner

U.S. Cl. X.R.

74—740, 759

UNITED STATES PATENT OFFICE
CERTIFICATE OF CORRECTION

Patent No. 3,505,905

April 14, 1970

Pierre Andre Georges Lepelletier

It is certified that error appears in the above identified patent and that said Letters Patent are hereby corrected as shown below:

In the heading to the printed specification, line 8, "Aug. 16, 1966" should read -- Aug. 19, 1966 --.

Signed and sealed this 16th day of February 1971.

(SEAL)
Attest:

Edward M. Fletcher, Jr.
Attesting Officer

WILLIAM E. SCHUYLER, JR.
Commissioner of Patents